(12) United States Patent
Ganot

(10) Patent No.: US 6,874,746 B2
(45) Date of Patent: Apr. 5, 2005

(54) RUNNER FOR A VEHICLE SEAT, AND A METHOD OF MANUFACTURING IT

(75) Inventor: Denis Ganot, Caen (FR)

(73) Assignee: Faurecia Sieges d/Automobile S.A., Nanterre (FR)

( * ) Notice: Subject to any disclaimer, the term of this patent is extended or adjusted under 35 U.S.C. 154(b) by 99 days.

(21) Appl. No.: 10/602,379

(22) Filed: Jun. 24, 2003

(65) Prior Publication Data

US 2004/0056165 A1 Mar. 25, 2004

(30) Foreign Application Priority Data

Jun. 25, 2002 (FR) .............................................. 02 07859

(51) Int. Cl.⁷ ................................................. B60N 2/07
(52) U.S. Cl. ..................................... 248/430; 248/429
(58) Field of Search ................................ 248/424, 429, 248/430

(56) References Cited

U.S. PATENT DOCUMENTS

| | | | |
|---|---|---|---|
| 5,829,666 A | | 11/1998 | Takeda et al. |
| 5,848,775 A | * | 12/1998 | Isomura et al. ............. 248/430 |
| 5,878,940 A | | 3/1999 | Rosenbalm |
| 5,893,959 A | | 4/1999 | Muellich |
| 5,915,660 A | * | 6/1999 | Kanda .......................... 248/430 |
| 5,931,436 A | * | 8/1999 | Rohee .......................... 248/430 |
| 5,941,495 A | | 8/1999 | Bauer et al. |
| 6,116,561 A | * | 9/2000 | Christopher ................. 248/429 |
| 6,152,415 A | * | 11/2000 | Seki et al. .................... 248/430 |
| 6,427,962 B1 | | 8/2002 | Rohee et al. |
| RE37,990 E | * | 2/2003 | Yamada et al. .............. 248/430 |
| 6,655,739 B2 | * | 12/2003 | Furukawa .................. 297/344.11 |
| 6,676,099 B2 | * | 1/2004 | Mallard et al. ............... 248/429 |

FOREIGN PATENT DOCUMENTS

| | | | |
|---|---|---|---|
| DE | 195 10 493 | 10/1995 | |
| DE | 198 58 846 | 6/2000 | |
| EP | 0 100 880 | 2/1984 | |
| FR | 2 793 453 | 11/2000 | |
| GB | 2 297 029 | 7/1996 | |
| JP | 61-295144 A | * 12/1986 | ................. 248/430 |
| JP | 62-74730 A | * 4/1987 | ................. 248/430 |

OTHER PUBLICATIONS

French Search Report for French Application No. FR 02 07859: report dated Mar. 13, 2003.

* cited by examiner

Primary Examiner—Leslie A. Braun
Assistant Examiner—Jon Szumny
(74) Attorney, Agent, or Firm—Marshall, Gerstein & Borun LLP

(57) ABSTRACT

A motor vehicle runner having one element comprising a fin connected to a base perpendicular to the find, said first runner element comprising first and second sheet metal section members each having a fin wall, the fin walls of the first and second section members touching each other and being fixed together via their main faces to form the fin of the runner element. The first section member further comprises a base wall connected to the fin wall of the first section member by a rounded bend which co-operates with the second section member to define a slot. The runner element further comprises a bridge of material which spans said slot and constitutes a direct rigid mechanical connection between the second section member and the base wall of the first section member.

10 Claims, 5 Drawing Sheets

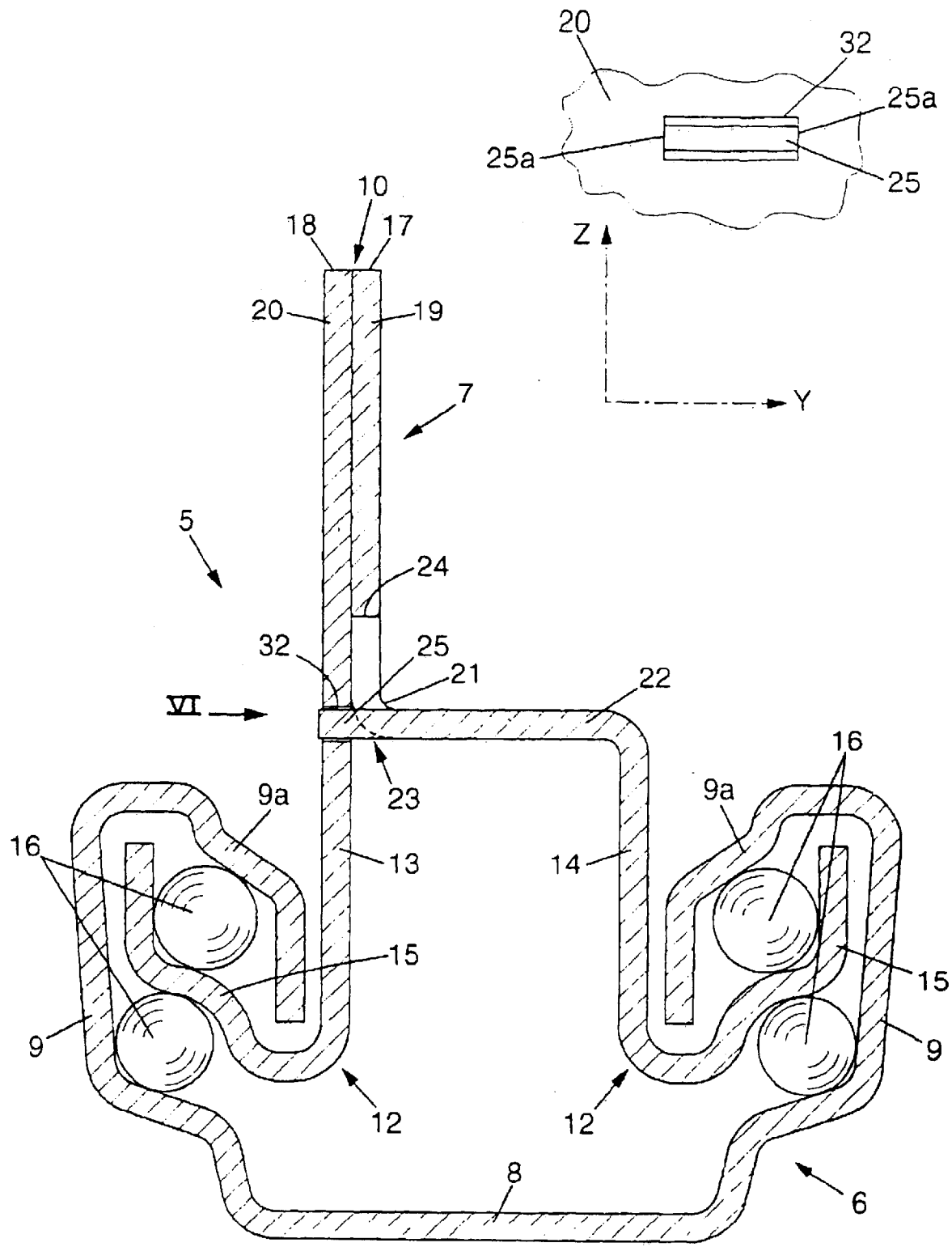

RUNNER FOR A VEHICLE SEAT, AND A METHOD OF MANUFACTURING IT

FIELD OF THE INVENTION

The present invention relates to runners for vehicle seats, and to methods of manufacturing them.

More particularly, the invention relates to a vehicle seat runner comprising first and second runner elements slidably mounted relative to each other in a longitudinal direction, the first runner element comprising a fin connected to a base that is substantially perpendicular to the fin and that extends perpendicularly to the transverse direction between two side portions in connection with the second runner element, said first runner element comprising first and second sheet metal section members each having a fin wall, the fin walls of the first and second section members touching each other and being fixed together via their main faces to form the fin of the first runner element, the first section member further comprising a base wall which forms at least part of the base of the first runner element, said base wall of the first section member being connected to the fin wall of said first section member via a rounded bend which co-operates with the second section member to define a slot.

BACKGROUND OF THE INVENTION

Document U.S. Pat. No. 5,941,495 describes an example of such a runner which has the drawback of presenting insufficient mechanical strength, in particular against forces tending to tear apart the first and second runner elements.

OBJECTS AND SUMMARY OF THE INVENTION

A particular object of the present invention is to mitigate that drawback.

For this purpose, according to the invention, in a runner of the kind in question, the first runner element further comprises at least one welded reinforcing tab which spans at least part of said slot and constitutes a direct rigid mechanical connection between the second section member and the base wall of the first section member.

By means of these dispositions, the first runner element is greatly stiffened, thus preventing said first runner element from opening or deforming in the event of the runner being subjected to large forces tending to tear it apart. More particularly, when the first runner element is of generally channel section with an element such as a runner latch being crimped therein, these dispositions also make it possible to guarantee that the crimping is long-lasting.

In preferred embodiments of the invention, it is possible also to resort to one or more of the following dispositions:
said reinforcing tab belongs to one of the first and second section members and is welded to the other of said first and second section members;
the reinforcing tab is formed by a plunged boss formed in the first section member level with said bend;
the fin wall of the second section member is extended in the same plane beyond the base, and said reinforcing tab has its end welded against said fin wall of the second section member;
the reinforcing tab of the first section member passes through the fin wall of the second section member;
the reinforcing tab of the first section member is welded to the fin wall of the second section member without addition of any filler;
the second section member has a base wall substantially coplanar with the base wall of the first section member, the base wall of the second section member being connected to the fin wall of said second section member by a rounded bend which co-operates with the rounded bend of the first section member to define part of said slot, and said second section member has an additional reinforcing tab which is welded to the reinforcing tab of the first section member;
the runner includes a runner latch crimped between two side flanges parallel to the fin and belonging respectively to the first and second section members, the latch being crimped in the vicinity of said reinforcing tab.

The invention also provides a method of manufacturing a runner as defined above, in which method the first and second section members are made, and then they are assembled together by welding the fin walls of said first and second section members together and by welding the end of the reinforcing tab of the first section member against the fin wall of the second section member, which wall is plane. Advantageously, the fin wall of the second section member is welded to the fin wall of the first section member and to the reinforcing tab of said first section member by laser welding by transparency.

BRIEF DESCRIPTION OF THE DRAWINGS

Other characteristics and advantages of the invention appear from the following description of three embodiments, given as non-limiting examples and with reference to the accompanying drawings.

In the drawings:

FIG. 5 is a view similar to FIG. 4 in a second embodiment of the invention;

FIG. 6 is a detail view seen looking along direction VI in FIG. 5; and

MORE DETAILED DESCRIPTION

In the various figures, elements that are identical or similar are designated by the same references.

Figure 1:
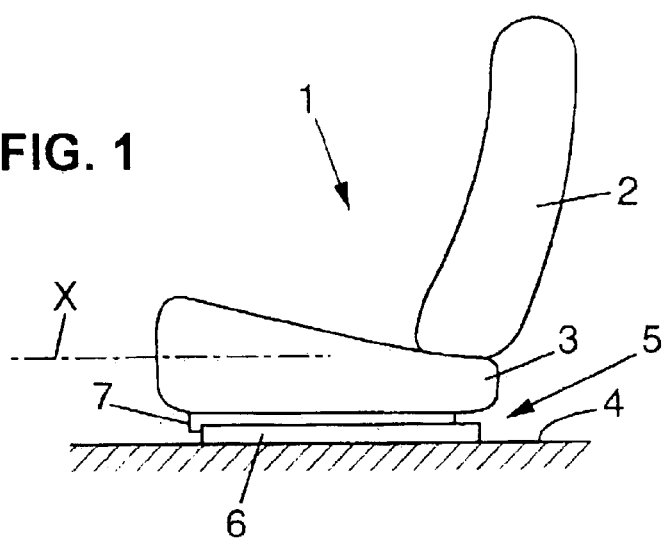
FIG. 1 is a diagrammatic view of a vehicle seat including a runner constituting an embodiment of the invention.

FIG. 1 shows a motor vehicle seat 1 comprising a back 2 carried by a seat proper 3, itself mounted on the floor 4 of the vehicle to slide in a longitudinal direction X.

The seat proper 3 is connected to the floor 4 via two parallel runners 5, only one of which can be seen in FIG. 1. Each runner 5 comprises a stationary runner element 6 secured to the floor 4 of the vehicle, and a moving runner element 7 which is secured to the seat proper 3 and which is mounted to slide in the direction X relative to the stationary runner element 6.

Figure 2:
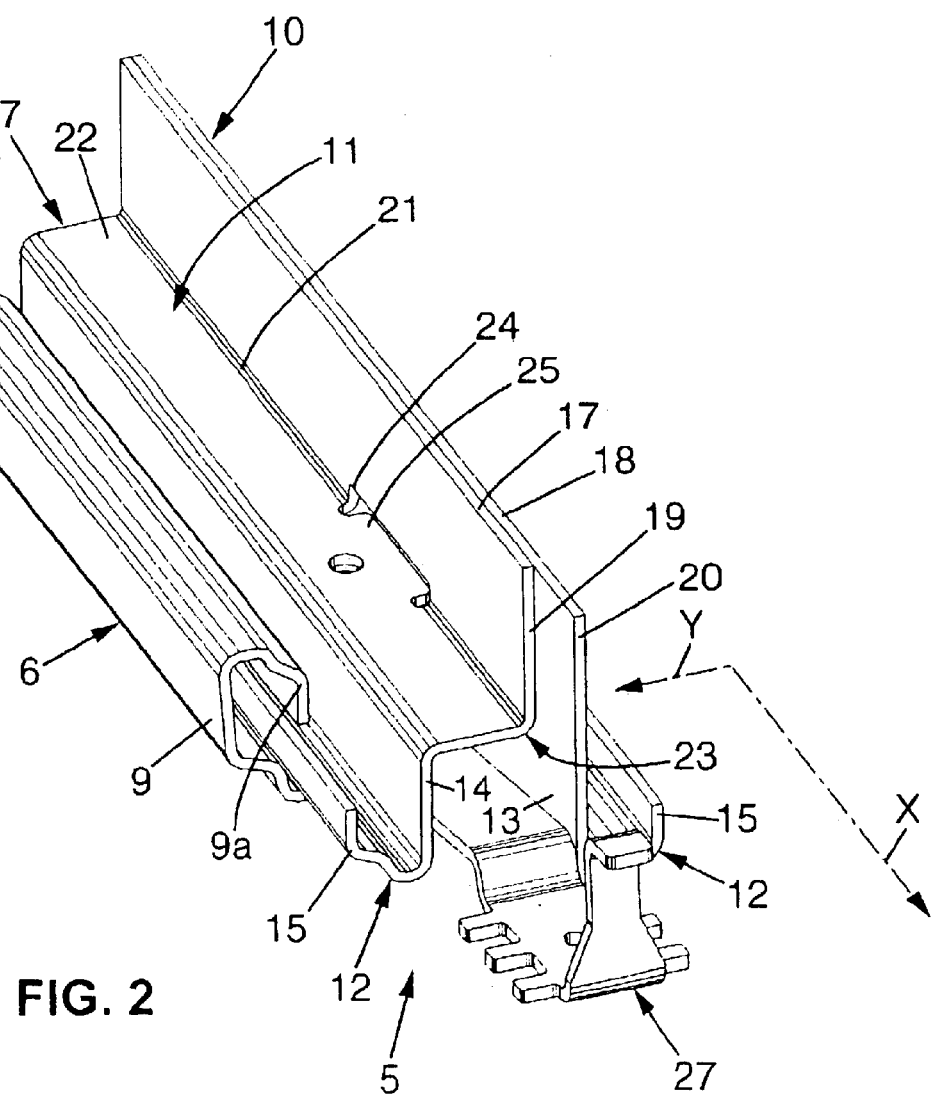
FIG. 2 is a cutaway view in perspective of the FIG. 1 runner.
Figure 3:
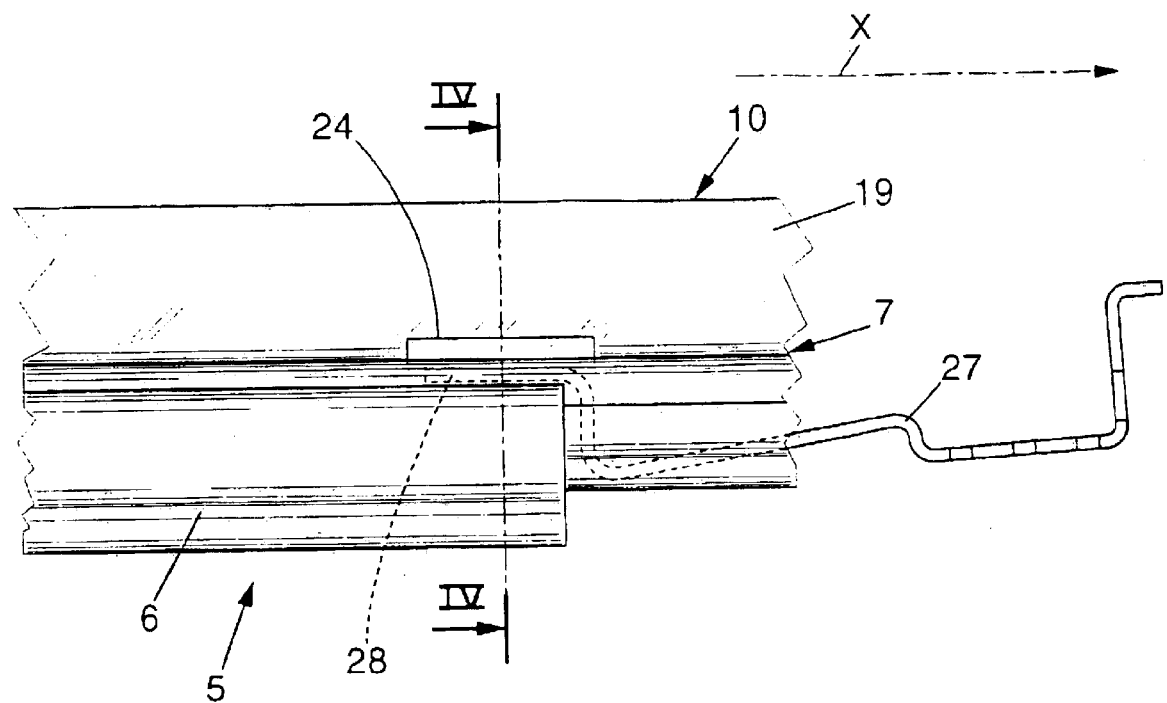
FIG. 3 is a side view of the FIG. 2 runner.
Figure 4:
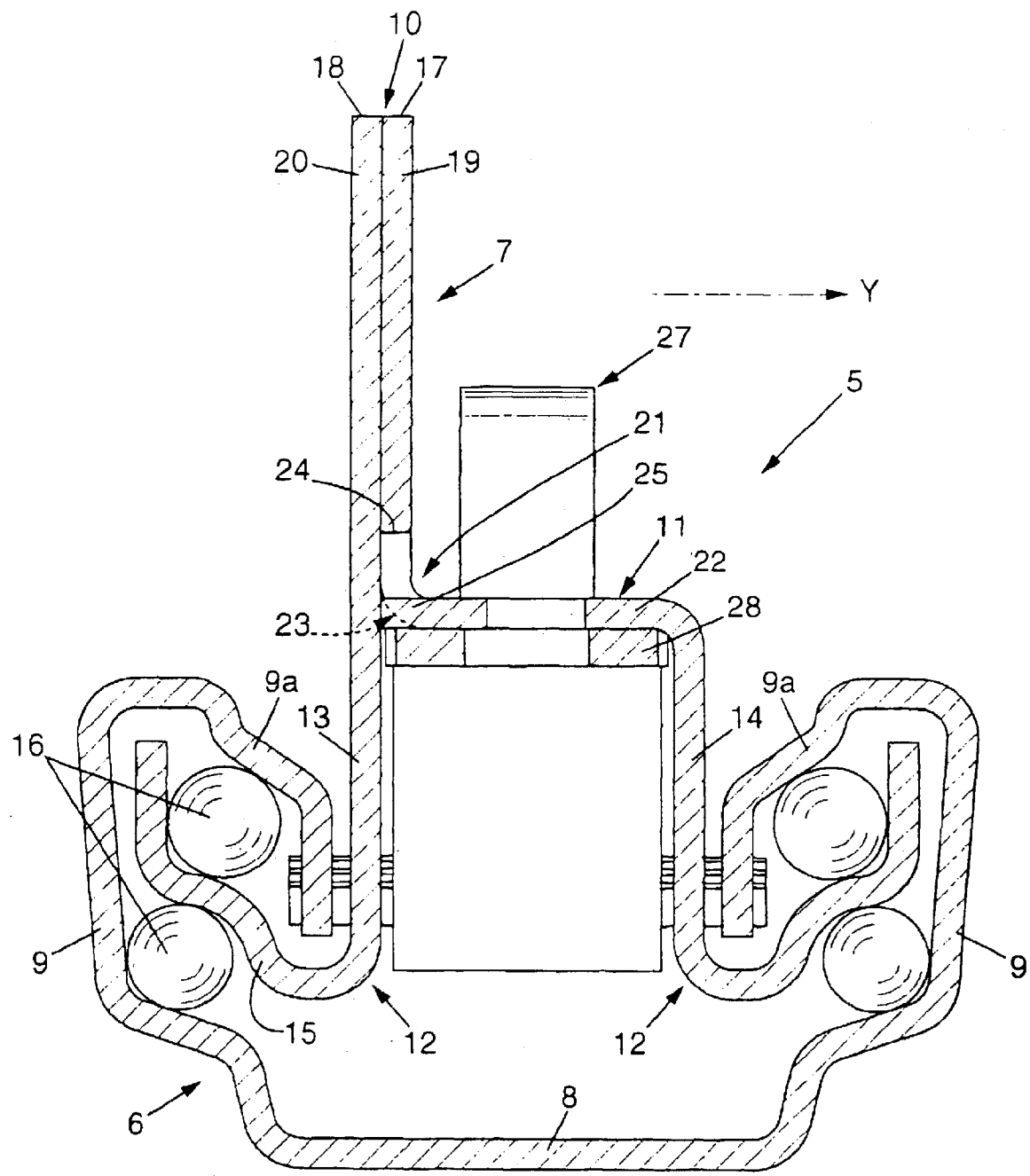
FIG. 4 is a section view on line IV—IV of FIG. 3.

As shown in greater detail in FIGS. 2 to 4, the stationary runner element 6 may be in the form, for example, of a section member of sheet metal that is bent and cut substantially into a channel section and which comprises:
a horizontal web 8 for fixing to the floor 4 of the vehicle;
two vertical side flanges 9 which extend substantially perpendicularly from the web; and two reentrant troughs 9a which extend the side flanges 8 towards the inside of the runner and towards the web 8.

The moving section member 7 comprises:

a substantially vertical fin 10 to which the structure of the seat proper 3 is secured; and a horizontal base 11 substantially perpendicular to the fin 10, the base 11 extending in a transverse direction Y between two side portions 12 in sliding connection with the stationary runner element 6.

In this example, the two side portions 12 in question comprise two flanges 13 and 14 that are substantially perpendicular to the base 11, which extend towards the web 8. These flanges 13, 14 are themselves extended outwards and away from the web 8 by two lips 15 which penetrate into the space left between the side flanges 9 and the reentrant troughs 9 of the stationary runner element 6.

Balls 16 or other rolling elements are generally interposed between the lips 15 and the side flanges 8, and also between the lips 15 and the reentrant troughs 9a.

In general, the shapes of the two runner elements are similar to those described in document FR-A-2 755 653.

The moving runner element 7 comprises two section members of bent and cut sheet metal 17 and 18 which respectively form two fin walls 19, 20.

These two fin walls 19, 20 are preferably mutually parallel plane walls which touch each other and which are fixed to each other so as to constitute the fin 10 of the moving runner element 7.

The two fin walls 19 and 10 may be fixed to each other by any known means, in particular by welding, and more particularly by a method of welding that does not require any filler material, such as laser welding by transparency (which method consists in sending a laser beam onto one of the walls 19, 20, preferably the wall 20, thereby heating both walls strongly and enabling spot welds or beads of welding to be formed).

The fin wall of the first section member 17 is extended via a rounded bend 21 by a base wall 22 which, in this example, constitutes all of the above-mentioned base 11.

Furthermore, the first section member 17 also comprises the side flange 14 and the lip 15 corresponding to the flange 14, extending the base wall 22.

The fin wall 20 of the second section member 18 is extended towards the web 8 in its own plane so as to form the above-mentioned side flange 13. The lip 15 which corresponds to this side flange 13 also belongs to the second section member 18.

The rounded bend 21 co-operates with the above-mentioned fin wall 20 to form a slot 23 that is open towards the web 8. In order to prevent this bend 21 and slot 23 from leading to excessive flexibility between the two side flanges 13 and 14, at least one plunged boss 24 is provided in the first section member 17 level with the bend 21 (and preferably a plurality of identical or similar bosses distributed along the length of the runner). This boss 24 enables a reinforcing tab 25 to be provided which is integral with the base wall 22 and which extends said base wall in a straight line to the fin wall 20 of the second section member by passing through the slot 23.

The reinforcing tab 25 is welded at its end to the fin wall 20, preferably by transparency welding with a laser beam being applied to the fin wall 20 from its side opposite from the reinforcing tab 25.

The reinforcing tab 25 thus constitutes a bridge of material creating a direct rigid connection between the base wall 22 of the first section member 17 and the section member 18, spanning the slot 23, thereby enabling the moving runner element 7 to be considerably stiffened and consequently increasing its strength, in particular against forces tending to tear the runner apart.

Furthermore, the latch 27 which serves to lock the runner selective in the position selected by the user may optionally be crimped between the two side flanges 13 and 14, as described for example in document FR-A-2 768 670. Under such circumstances, the above-described dispositions also make it possible to guarantee that the crimping between the crimped portion 28 of the latch and the flanges 13 and 14 of the moving runner element 7 is long-lasting.

It should be observed that the above-described method of assembling the section members 17 and 18 together is particularly simple, given that the first section member 17 is merely abutted against the plane fin wall 20 of the second section member, and given that assembly is performed solely from outside the section member, by welding without using any filler material, and in particular by laser welding by transparency.

Figure 7:
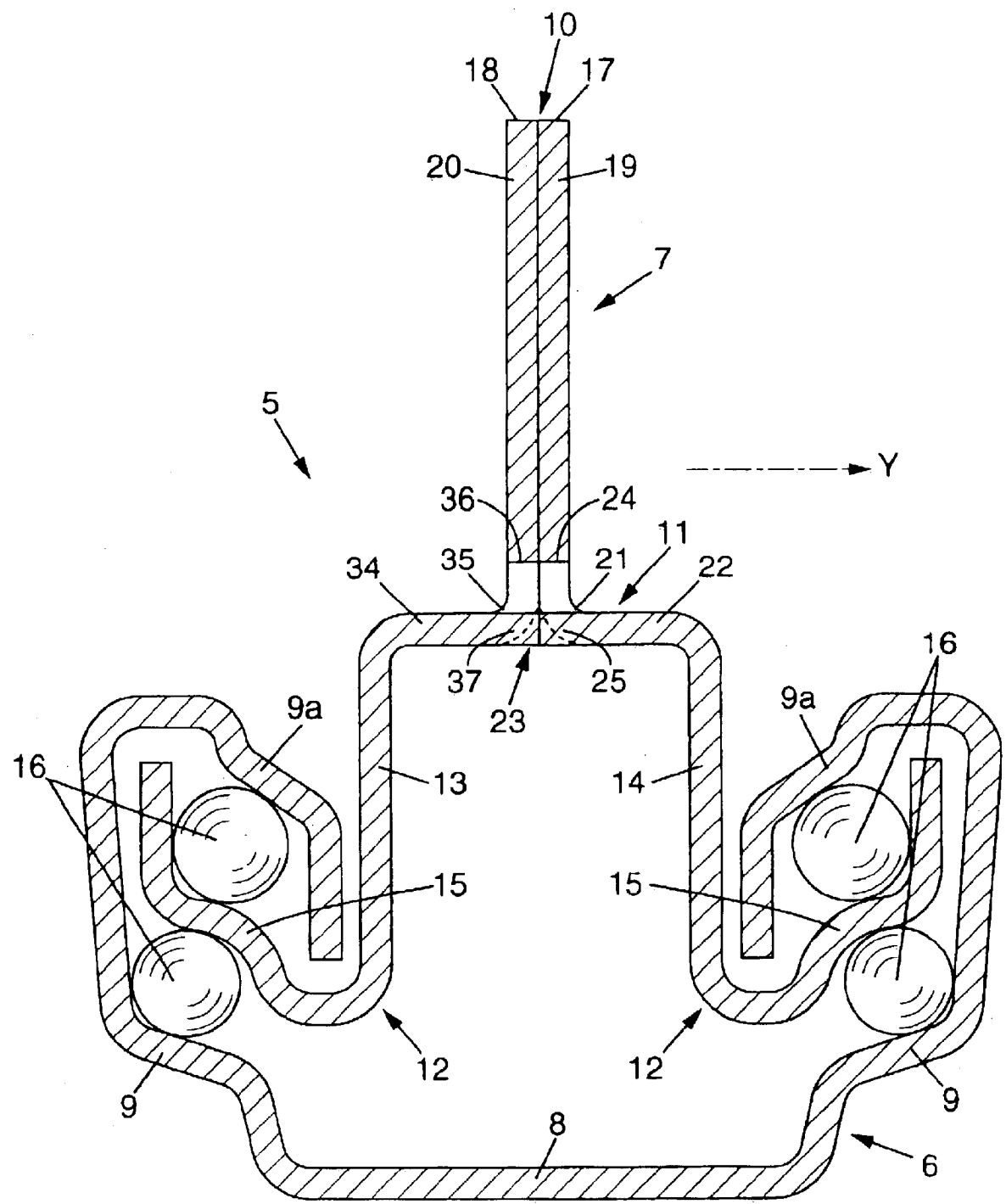
FIG. 7 is a view similar to FIG. 4 for another embodiment of the invention.

The two embodiments described below with reference to FIGS. 5 to 7 are similar to the first embodiment described above and are therefore not described in detail herein. Only the differences between these additional embodiments and the first embodiment are therefore mentioned. It should be observed that although the latch 27 is not shown in FIGS. 5 to 7, this latch could be crimped as described above in the embodiments of FIGS. 5 to 4.

In the second embodiment of the invention as shown in FIGS. 5 and 6, the reinforcing tab 25 is longer than in the first embodiment, such that this reinforcing tab passes through a cutout 32 formed in the fin wall 20 of the second section member.

In the example described, in order to make it easier to position the first and second section members 17 and 18 relative to each other, the cutout 32 is larger than the reinforcing tab 25 in the vertical direction Z, with the reinforcing tab 25 being welded to the fin wall 20 via its two sides 25a.

In the third embodiment of the invention, shown in FIG. 7, the first section member 17 is similar in shape to that shown in FIG. 4, although its base wall 22 is narrower in the Y direction since the second section member 18 in this embodiment has a base wall 34 which is substantially coplanar with the base wall 22 of the first section member and which extends the fin wall 20 substantially at right angles going away from the first section member 17, said base wall 34 itself being extended downwards by the side flange 13 which is itself extended by the corresponding lip 15 as described above.

In this embodiment, each of the two section members 17 and 18 has a rounded bend respectively referenced 21, 35 between its fin wall 19, 20 and its base wall 22, 34. These two rounded bends define between them a slot 23 that is open towards the web 8.

In this FIG. 7 embodiment, the section members 17 and 18 have mutually corresponding plunged bosses 24, 36 provided in the bends 21, 35 so as to release pairs of reinforcing tabs 25, 37.

Each reinforcing tab 25, 37 is integral with the corresponding base wall 22, 34 and extends this base wall in a straight line to the opposite reinforcing tab 37, 25. Thus, the reinforcing tabs 25, 37 make mutual contact via their end faces 25a, 37a, which can be welded together, e.g. by laser welding so as to create a rigid connection spanning the slot 23 between the base walls 22, 34 of the two section members.

What is claimed is:

1. A vehicle seat runner comprising first and second runner elements slidably mounted relative to each other in a longitudinal direction, the first runner element comprising a fin connected to a base that is substantially perpendicular to the fin and that extends perpendicularly to the longitudinal direction between two side portions in connection with the second runner element, said first runner element comprising first and second sheet metal section members each having a fin wall, the fin walls of the first and second section members touching each other and being fixed together via their main faces to form the fin of the first runner element, the first section member further comprising a base wall which forms at least part of the base of the first runner element, said base wall of the first section member being connected to the fin wall of said first section member via a rounded bend which co-operates with the second section member to define a slot, wherein the first runner element further comprises at least one welded reinforcing tab which spans at least part of said slot and constitutes a direct rigid mechanical connection between the second section member and the base wall of the first section member.

2. The runner according to claim 1, including a runner latch crimped between two side flanges parallel to the fin and belonging respectively to the first and second section members, the latch being crimped in the vicinity of said reinforcing tab.

3. The runner according to claim 1, in which said reinforcing tab belongs to one of the first and second section members and is welded to the other of said first and second section members.

4. The runner according to claim 3, in which the reinforcing tab is formed by a plunged boss formed in the first section member level with said bend.

5. The runner according to claim 4, in which the reinforcing tab of the first section member passes through the fin wall of the second section member.

6. The runner according to claim 4, in which the reinforcing tab of the first section member is welded to the fin wall of the second section member without addition of any filler.

7. The runner according to claim 4, in which the second section member has a base wall substantially coplanar with the base wall of the first section member, the base wall of the second section member being connected to the fin wall of said second section member by a rounded bend which co-operates with the rounded bend of the first section member to define part of said slot, and said second section member has an additional reinforcing tab which is welded to the reinforcing tab of the first section member.

8. The runner according to claim 4, in which the fin wall of the second section member is extended in a plane beyond the base, and said reinforcing tab has its end welded against said fin wall of the second section member.

9. A method of manufacturing a runner according to claim 8, in which method the first and second section members are made, and then they are assembled together by welding the fin walls of said first and second section members together and by welding the end of the reinforcing tab of the first section member against the fin wall of the second section member, which wall is plane.

10. The method according to claim 9, in which the fin wall of the second section member is welded to the fin wall of the first section member and to the reinforcing tab of said first section member by laser welding by transparency.

* * * * *